United States Patent
Chang et al.

(10) Patent No.: US 7,583,323 B2
(45) Date of Patent: Sep. 1, 2009

(54) METHOD AND APPARATUS FOR SCALING IMAGE BLOCK

(75) Inventors: Yi-Shu Chang, Hsin-Chu Hsien (TW); Zou-Ping Chen, Tai-Chung (TW); Tsung-Chi Lin, Taipei (TW); Cheng-Shun Liao, Chang-Hua Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 803 days.

(21) Appl. No.: 11/162,575

(22) Filed: Sep. 15, 2005

(65) Prior Publication Data
US 2006/0078227 A1   Apr. 13, 2006

(30) Foreign Application Priority Data
Sep. 24, 2004   (TW) ............... 93129137 A

(51) Int. Cl.
*H04N 1/393* (2006.01)
*H04N 9/74* (2006.01)

(52) U.S. Cl. ............... 348/581; 348/598; 348/589; 348/597; 382/298; 345/629; 345/640

(58) Field of Classification Search ............... 348/584, 348/581, 561, 704, 597, 598, 589; 382/298, 382/299; 345/660, 472, 629, 639, 640
See application file for complete search history.

(56) References Cited

U.S. PATENT DOCUMENTS

| 5,874,967 | A  | * | 2/1999 | West et al. ............... 345/629 |
| 6,353,450 | B1 | * | 3/2002 | DeLeeuw ............... 715/768 |
| 6,380,945 | B1 |   | 4/2002 | MacInnis et al. |
| 6,570,579 | B1 |   | 5/2003 | MacInnis et al. |
| 6,630,945 | B1 |   | 10/2003 | MacInnis et al. |
| 7,317,826 | B2 | * | 1/2008 | Wilensky et al. ............ 382/162 |

* cited by examiner

*Primary Examiner*—David L Ometz
*Assistant Examiner*—Jean W Désir
(74) *Attorney, Agent, or Firm*—Winston Hsu

(57) ABSTRACT

An image scaling method for calculating a pixel value of a target pixel within a scaled image block is disclosed. The method includes selecting a plurality of reference pixels from the image block, wherein each reference pixel has a pixel value and corresponds to a transparency parameter; respectively setting a corresponding weight value for each reference pixel; adjusting the weight values according to the transparency parameters of the reference pixels; and blending the pixel values of the reference pixels to generate the pixel value of the target pixel according to the adjusted weight values of the reference pixels.

36 Claims, 4 Drawing Sheets

| α1 | α2 | α3 | α4 | W1' | W2' | W3' | W4' |
|---|---|---|---|---|---|---|---|
| >0 | >0 | >0 | >0 | W1 | W2 | W3 | W4 |
| >0 | >0 | >0 | =0 | W1 | W2 | W3+W4 | 0 |
| >0 | >0 | =0 | >0 | W1 | W2 | 0 | W3+W4 |
| >0 | >0 | =0 | =0 | W1 | W2 | 0 | 0 |
| >0 | =0 | >0 | >0 | W1 | 1−W1 | 0 | W4 |
| >0 | =0 | >0 | =0 | W1 | 0 | W2+W3 | 0 |
| >0 | =0 | =0 | >0 | W1+W2 | 0 | W3+W4 | 0 |
| >0 | =0 | =0 | =0 | W1+W2 | 0 | 0 | W3+W4 |
| =0 | >0 | >0 | >0 | 0 | W1+W2 | W3 | W4 |
| =0 | >0 | >0 | =0 | 0 | W1+W2 | W3+W4 | 0 |
| =0 | >0 | =0 | >0 | 0 | 1 | 0 | 0 |
| =0 | >0 | =0 | =0 | 0 | 0 | 1−W4 | W4 |
| =0 | =0 | >0 | >0 | 0 | 0 | 1 | 0 |
| =0 | =0 | >0 | =0 | 0 | 0 | 0 | 1 |
| =0 | =0 | =0 | =0 | 0 | 0 | 0 | 0 |

Fig. 4

METHOD AND APPARATUS FOR SCALING IMAGE BLOCK

BACKGROUND OF THE INVENTION

1. Field of the Invention

The present invention relates to an image scaling method and apparatus, and more particularly, to an image scaling method and apparatus in a digital television.

2. Description of the Prior Art

As conventional analog video broadcasting is transforming to digital video broadcasting (DVB), digital televisions become more popular.

The digital television signals include video data and caption data, wherein the caption data is generally a subtitle or a closed caption such as scripts, logos, scrolling banners, etc. Typically, different circuits process the video data and the caption data respectively. The processed video data, processed caption data, and other information are then mixed by a video mixer/blender to form a composite frame.

When a user enables a television function that changes the size of the pictures (e.g., the picture-in-picture (PIP) function), the sizes of both the video data and the caption data must be scaled. Well known in the art, the foreground pixels and the background pixels of the caption data are represented with a pixel format containing a transparency parameter (e.g., an $\alpha$ value) such as the ARGB or $AYC_bC_r$ format during the scaling operations. The foreground pixel and the background pixel have distinct $\alpha$ values, so, the following stages such as the video mixer/blender, can differentiate the foreground and the background of the caption accordingly.

The conventional art typically scales the caption data by interpolation. Unfortunately, gradient colors, sawtooth phenomenon, and other undesirable problems usually appear on the edge of the foreground of the scaled caption and thereby deteriorate the smoothness and sharpness of the scaled caption data.

SUMMARY OF THE INVENTION

It is therefore an objective of the claimed invention to provide an image scaling method and apparatus to solve the above-mentioned problems.

It is therefore an objective of the claimed invention to provide an image scaling method and apparatus to improve the smoothness and the sharpness of the foreground of the scaled image.

It is therefore an objective of the claimed invention to provide an image scaling method and apparatus to eliminate the background color left on the edge of the scaled foreground.

According to an exemplary embodiment of the present invention, an image scaling method for calculating a pixel value of a target pixel within a scaled image block is disclosed comprising: selecting a plurality of reference pixels from the image block, wherein each reference pixel has a pixel value and corresponds to a transparency parameter; respectively setting a corresponding weight value for each reference pixel; adjusting the weight values according to the transparency parameters of the reference pixels; and blending the pixel values of the reference pixels to generate the pixel value of the target pixel according to the adjusted weight values of the reference pixels.

According to an exemplary embodiment of the present invention, an image scaling device for calculating a pixel value of a target pixel within a scaled image block is disclosed comprising: a selecting device for selecting a plurality of reference pixels from the image block, wherein each reference pixel has a pixel value and corresponds to a transparency parameter; a weight value setting unit coupled to the selecting device for respectively setting a corresponding weight value for each reference pixel and for adjusting the weight values according to the transparency parameters of the reference pixels; and a computing device coupled to the selecting device and the weight value setting unit for blending the pixel values of the reference pixels to generate the pixel value of the target pixel according to the adjusted weight values of the reference pixels.

According to an exemplary embodiment of the present invention, an image scaling method for calculating a pixel value of a target pixel within a scaled image block is disclosed comprising: selecting a plurality of reference pixels from the image block, wherein each reference pixel has a pixel value and corresponds to a transparency parameter; respectively setting a corresponding weight value for each reference pixel according to the transparency parameter of the reference pixel; and blending the pixel values of the reference pixels to generate the pixel value of the target pixel according to the weight values of the reference pixels; wherein the reference pixel with a transparency parameter less than or equal to a predetermined value is defined as a background pixel and the reference pixel with a transparency parameter greater than the predetermined value is defined as a foreground pixel.

According to the exemplary embodiment of the present invention, an image scaling device for calculating a pixel value of a target pixel within a scaled image block is disclosed comprising: a selecting device for selecting a plurality of reference pixels from the image block, wherein each reference pixel has a pixel value and corresponds to a transparency parameter; a weight value setting unit coupled to the selecting device for respectively setting a corresponding weight value for each reference pixel according to the transparency parameter of the reference pixel; and a computing device coupled to the weight value setting unit for blending the pixel values of the reference pixels to generate the pixel value of the target pixel according to the weight values of the reference pixels; wherein the reference pixel with a transparency parameter less than or equal to a predetermined value is defined as a background pixel and the reference pixel with a transparency parameter greater than the predetermined value is defined as a foreground pixel.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is schematic diagram of a look-up table of FIG. 1 according to one embodiment of the present invention.

DETAILED DESCRIPTION

Figure 1:
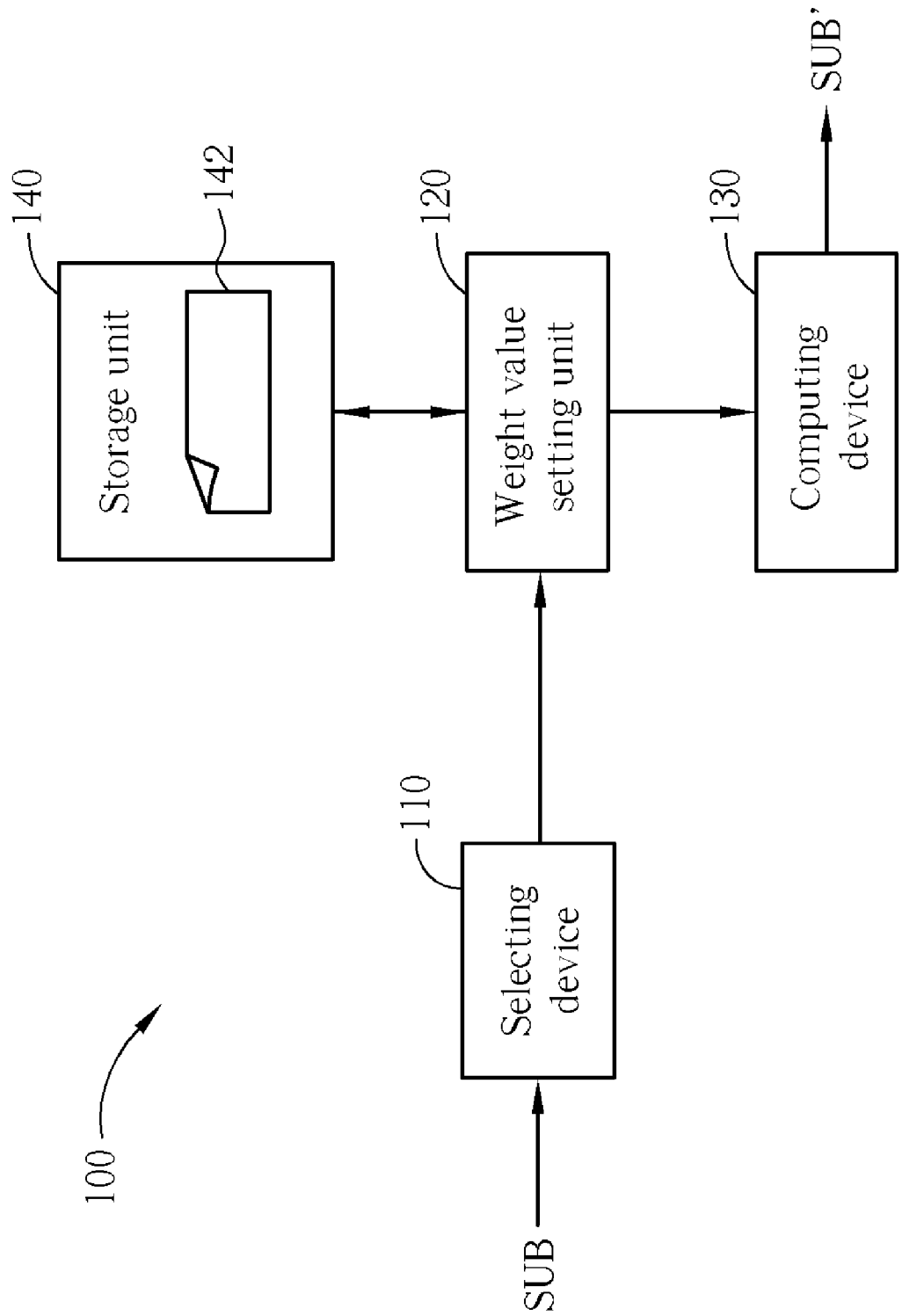
FIG. 1 is a simplified block diagram of an image scaler according to one embodiment of the present invention.

Please refer to FIG. 1, which shows a simplified block diagram of an image scaler 100 according to one embodiment of the present invention. The image scaler 100 scales the caption data such as scripts, TV station logos, scrolling banners and so forth. The scaled data is then transmitted to a video mixer to be mixed with other image data. As shown in FIG. 1, the image scaler 100 comprises a selecting device 110, a weight value setting unit 120, and a computing device 130. The operations of the image scaler 100 are described by flowcharts in detail below.

Figure 2:
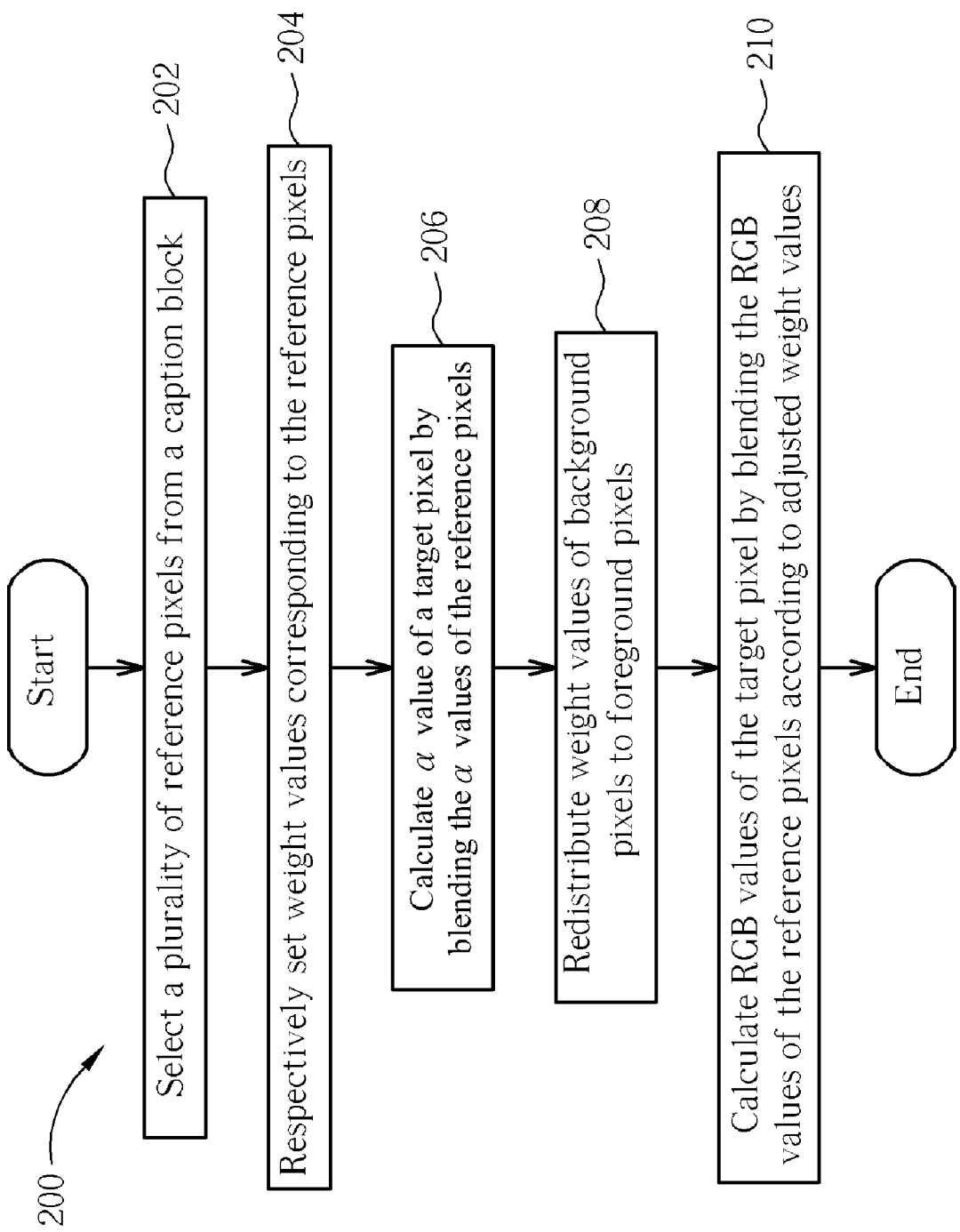
FIG. 2 is a flowchart illustrating the operations of the image scaler of FIG. 1 as it scales a caption block according to one embodiment of the present invention.
Figure 3:
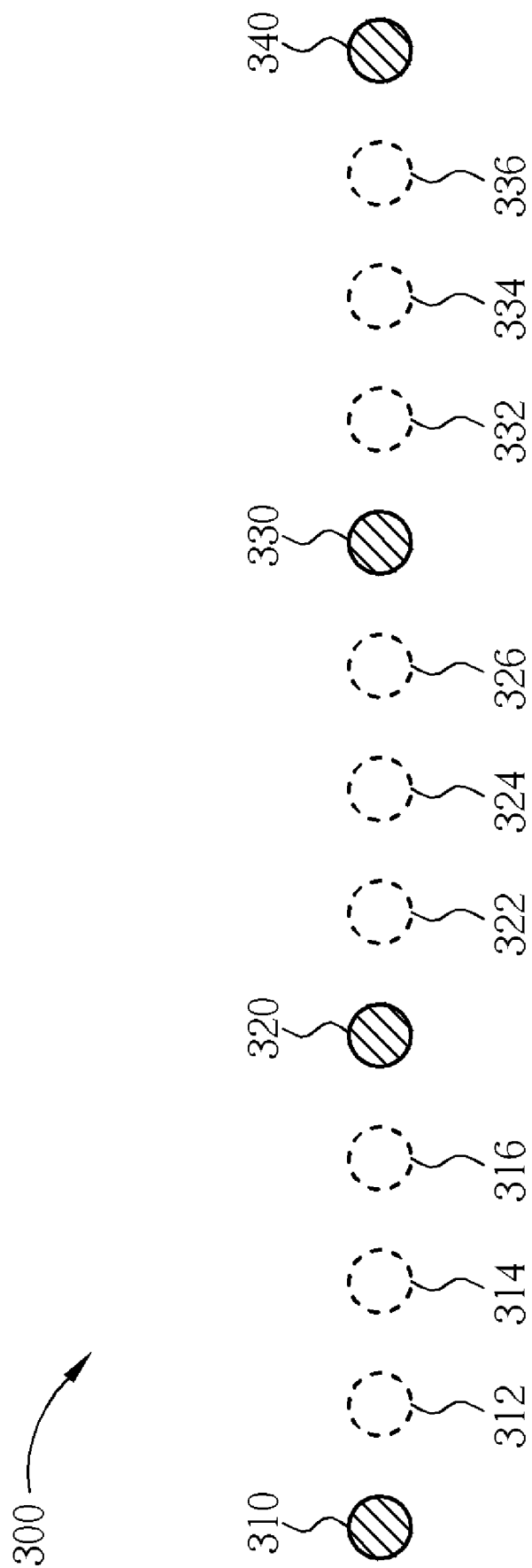
FIG. 3 is a schematic diagram of interpolating pixels of a caption block in accordance with the present invention.

FIG. 2 depicts a flowchart 200 illustrating the operations of the image scaler 100 as it scales a caption block according to one embodiment of the present invention. For convenient descriptions, a schematic diagram 300 of pixels shown in FIG. 3 is referred when elaborating the steps of the flowchart 200.

Firstly, in Step 202, the selecting device 110 of the image scaler 100 receives data SUB corresponding to a caption block and selects a plurality of reference pixels from the caption block. For example, the selecting device 110 may select four reference pixels from the caption block such as pixels 310, 320, 330, and 340 shown in FIG. 3.

In Step 204, the weight value setting unit 120 sets weight values W1, W2, W3, and W4 corresponding to the reference pixels 310, 320, 330, and 340, respectively. Then, in Step 206, the computing device 130 calculates the transparency parameters of the target pixels to be interpolated such as the target pixels 312, 314, 316, 322, 324, 326, 332, 334, and 336 by blending the transparency parameters of the reference pixels 310, 320, 330, and 340 according to the weight values W1, W2, W3, and W4. In this embodiment, the transparency parameter is the α value of the pixel.

In order to solve the undesirable results such as gradient colors or the sawtooth phenomenon that appear along the edge of the foreground of the scaled caption in the prior art, the image scaler 100 of this embodiment performs Step 208 before the computing device 130 calculates the RGB values of the target pixel to be interpolated. In Step 208, the weight value setting unit 120 is utilized for redistributing the weight values of the background pixels to the foreground pixels. As mentioned above, the weight value setting unit 120 can differentiate the foreground pixel and the background pixel according to the α value of the reference pixel. For example, if the α value of the background pixel of the caption data is equal to a predetermined value, such as zero, a reference pixel that has a α value greater than zero is defined as a foreground pixel.

In a preferred embodiment, the image scaler 100 further comprises a storage unit 140 as shown in FIG. 1. The storage unit 140 is utilized for storing a look-up table 142 containing and recording rules for adjusting the weight values of the plurality of reference pixels. As a result, the weight value setting unit 120 can perform Step 208 according to the look-up table 142.

FIG. 4 is schematic diagram of a look-up table 142 of FIG. 1 according to one embodiment of the present invention. The look-up table 142 is stored in the storage unit 140. In practice, the storage unit 140 may be a volatile memory or a non-volatile memory. In the look-up table 142, α1, α2, α3, and α4 are recorded in a first row 410 and respectively correspond to the α value of the reference pixels 310, 320, 330, and 340 while W1', W2', W3', and W4' respectively correspond to the adjusted weight value of the reference pixels 310, 320, 330, and 340. For example, if all the α1, α2, α3, and α4 are greater than zero, meaning that the reference pixels 310, 320, 330, and 340 are located in the foreground of the caption block, the weight value setting unit 120 sets: W1'=W1, W2'=W2, W3'=W3, and W4'=W4 according to the distribution rules recorded in a row 420 of the look-up table 142 in Step 208. In other words, the weight values of the reference pixels 310, 320, 330, and 340 remain. Suppose that the α1, α2 and α3 are greater than zero while the α4 is equal to zero, meaning that the reference pixels 310, 320 and 330 are located in the foreground of the caption block while the reference pixel 340 is located in the background, then the weight value setting unit 120 redistributes the weight value W4 of the reference pixel 340 to the reference pixel 330 according to the distributing rules recorded in a row 430 of the look-up table 142. As a result, the adjusted weight value W3' of the reference pixel 330 becomes the value W3+W4 while the adjusted weight value W4' of the reference pixel 340 becomes zero.

In another situation, suppose that the reference pixels 310 and 320 are located in the foreground, meaning that both the α1 and α2 are greater than zero while the reference pixels 330 and 340 are located in the background, meaning that both the α3 and α4 are equal to zero. In Step 208, the weight value setting unit 120 redistributes the weight values W3 and W4 of the reference pixels 330 and 340 to the reference pixel 320 according to the distribution rules recorded in a row 450 of the look-up table 142. Accordingly, the adjusted weight value W2' of the reference pixel 320 becomes the value 1-W1 while both the adjusted values W3' and W4' of the reference pixels 330 and 340 become zero.

In Step 210, the computing device 130 blends the RGB values of the reference pixels 310, 320, 330, and 340 to obtain the RGB values of the plurality of target pixels to be interpolated according to the adjusted weight values W1', W2', W3', and W4'.

The order of the aforementioned Steps is merely an embodiment and does not limit the application of the present invention. For example, Step 206 can be performed after Step 210 is complete.

In practice, the computing device 130 can be implemented with a digital filter and the weight values configured by the weight value setting unit 120 in Steps 204 and 208 are the coefficients of the digital filter. The digital filter can use up-sampling to calculate the α value or the RGB values of the plurality of target pixels to be interpolated. Up-sampling operations are well known in the art and further details are therefore omitted. Note that the number of target pixels to be interpolated by the computing device 130 is a design choice and not limited to any specific number. In other embodiments, the computing device 130 may select a proper number of pixels among the plurality of interpolated target pixels and the existing pixels to form a scaled caption data SUB' according to the scaling ratio.

As in the foregoing illustrations, the combination of weight values of the plurality of reference pixels utilized by the image scaler 100 when calculating the α value of a target pixel is different from the combination of weight values utilized by the image scaler 100 when calculating the RBG values of the target pixel. When the image scaler 100 calculates the RGB values of a target pixel according to a plurality of reference pixels, the image scaler 100 first redistributes the weight values of the reference pixels located in the background to the reference pixels located in the foreground and then performs a weight blending operation according to the adjusted weight values. In other words, the weights of the foreground pixels are increased during the calculations of the RGB values of the target pixel, meaning that the sum of weight values of the foreground pixels is greater than the sum of weight values of the background pixels. As a result, the undesirable problem that the RGB values of the background pixels mix with the scaled foreground pixels is well solved.

Those skilled in the art will readily observe that numerous modifications and alterations of the device and method may be made while retaining the teachings of the invention.

Accordingly, the above disclosure should be construed as limited only by the metes and bounds of the appended claims.

The invention claimed is:

1. An image scaling method for calculating a pixel value of a target pixel within a scaled image block scaled from an image block, the method comprising:

selecting a plurality of reference pixels from the image block, wherein each reference pixel has a pixel value and corresponds to a transparency parameter, and the reference pixel with a transparency parameter less than or equal to a predetermined value is defined as a background pixel and the reference pixel with a transparency parameter greater than the predetermined value is defined as a foreground pixel;

respectively setting a corresponding weight value for each reference pixel;

adjusting the weight values of the reference pixels according to a combination of the transparency parameters of the reference pixels which is recorded in a look-up table, wherein the look-up table stores all combinations of the transparency parameters of the reference pixels and stores the adjusted weight values of the reference pixels corresponding to each combination of the transparency parameters; and generating the pixel values of the reference pixels to generate the pixel value of the target pixel according to the adjusted weight values of the reference pixels.

2. The method of claim 1, wherein the step of adjusting the weight values further comprises:

reducing the weight values of the background pixels and distributing a total decrement of the weight values of the background pixels to the foreground pixels.

3. The method of claim 1, wherein the step of adjusting the weight values further comprises:

setting a sum of the weight values of the background pixels to be less than a sum of the weight values of the foreground pixels.

4. The method of claim 1, wherein the step of adjusting the weight values further comprises:

setting a sum of the weight values of the background pixels to be a value k and setting a sum of the weight values of the foreground pixels to be 1−k, wherein the value k is greater than or equal to zero.

5. The method of claim 1, wherein the pixel value is an R value, a G value, and a B value.

6. The method of claim 1, wherein the pixel value is a Y value, a $C_b$ value, and a $C_r$ value.

7. The method of claim 1, wherein the image block is a subtitle.

8. The method of claim 1, wherein the image block is a closed caption.

9. The method of claim 1, further comprising:

generating the transparency parameters to calculate a transparency parameter of the target pixel according to the non-adjusted weight values.

10. The method of claim 1, wherein the transparency parameter is an α value.

11. An image scaling device for calculating a pixel value of a target pixel within a scaled image block scaled from an image block, the image scaling device comprising:

a selecting device for selecting a plurality of reference pixels from the image block, wherein each reference pixel has a pixel value and corresponds to a transparency parameter, and the reference pixel with a transparency parameter less than or equal to a predetermined value is defined as a background pixel and the reference pixel with a transparency parameter greater than the predetermined value is defined as a foreground pixel;

a weight value setting unit coupled to the selecting device for respectively setting a corresponding weight value for each reference pixel and for adjusting the weight values of the reference pixels according to a combination of the transparency parameters of the reference pixels which is recorded in a look-up table, wherein the look-up table stores all combinations of the transparency parameters of the reference pixels and stores the adjusted weight values of the reference pixels corresponding to each combination of the transparency parameters;

a storage unit coupled to the weight value setting unit for storing the look-up table; and a computing device coupled to the selecting device and the weight value setting unit for generating the pixel values of the reference pixels to generate the pixel value of the target pixel according to the adjusted weight values of the reference pixels.

12. The image scaling device of claim 11, wherein the weight value setting unit adjusts the weight values by reducing the weight values of the background pixels and distributing a total decrement of the weight values of the background pixels to the foreground pixels.

13. The image scaling device of claim 11, wherein the weight value setting unit adjusts the weight values by setting a sum of the weight values of the background pixels to be less than a sum of the weight values of the foreground pixels.

14. The image scaling device of claim 11, wherein the weight value setting unit adjusts the weight values by setting a sum of the weight values of the background pixels to be a value k and setting a sum of the weight values of the foreground pixels to be 1−k, wherein the value k is greater than or equal to zero.

15. The image scaling device of claim 11, wherein the pixel value is an R value, a G value, and a B value.

16. The image scaling device of claim 11, wherein the pixel value is a Y value, a $C_b$ value, and a $C_r$ value.

17. The image scaling device of claim 11, wherein the image block is a subtitle.

18. The image scaling device of claim 11, wherein the image block is a closed caption.

19. The image scaling device of claim 11, wherein the computing device is further utilized for generating the transparency parameters to calculate a transparency parameter of the target pixel according to the non-adjusted weight values.

20. The image scaling device of claim 11, wherein the computing device is a digital filter.

21. The image scaling device of claim 11, wherein the transparency parameter is a α value.

22. An image scaling method for calculating a pixel value of a target pixel within a scaled image block scaled from an image block, the method comprising:

selecting a plurality of reference pixels from the image block, wherein each reference pixel has a pixel value and corresponds to a transparency parameter;

respectively setting a corresponding weight value for each reference pixel according to the transparency parameter of the reference pixel and a look-up table, wherein the look-up table stores an adjusted weight value corresponding to each transparency parameter, and the step of setting the weight values comprises:

respectively setting a non-adjusted weight value for each reference pixel; and adjusting the non-adjusted weight values to produce adjusted weight values according to the look-up table and then utilizing the adjusted weight values as the weight values of the reference pixels; and generating the pixel values of the reference pixels to generate the pixel value of the target pixel according to the weight values of the reference pixels;

wherein the reference pixel with a transparency parameter less than or equal to a predetermined value is defined as a background pixel and the reference pixel with a transparency parameter greater than the predetermined value is defined as a foreground pixel.

23. The method of claim 22, wherein the step of setting the weight values further comprises:

setting a sum of the weight values of the background pixels to be a value k and setting a sum of the weight values of the foreground pixels to be 1−k, wherein the value k is greater than or equal to zero and 1−k is greater than the value k.

24. The method of claim 22, wherein the step of adjusting the non-adjusted weight values further comprises:

reducing the non-adjusted weight values of the background pixels and distributing a total decrement of the original weight values of the background pixels to the foreground pixels.

25. The method of claim 22, wherein the step of adjusting the non-adjusted weight values further comprises:

setting a sum of the non-adjusted weight values of the background pixels to be a value k and setting a sum of the weight values of the foreground pixels to be 1−k, wherein the value k is greater than or equal to zero and 1−k is greater than the value k.

26. The method of claim 22, further comprising:

generating the transparency parameters to calculate a transparency parameter of the target pixel according to the non-adjusted weight values.

27. The method of claim 22, wherein the image block is a subtitle.

28. The method of claim 22, wherein the image block is a closed caption.

29. An image scaling device for calculating a pixel value of a target pixel within a scaled image block, scaled from and image block the image scaling device comprising:

a selecting device for selecting a plurality of reference pixels from the image block, wherein each reference pixel has a pixel value and corresponds to a transparency parameter;

a weight value setting unit coupled to the selecting device for respectively setting a corresponding weight value for each reference pixel according to the transparency parameter of the reference pixel and a look-up table, wherein the look-up table stores an adjusted weight value corresponding to each transparency parameter, the weight value setting unit respectively sets a non-adjusted weight value for each reference pixel and then adjusts the non-adjusted weight values to produce adjusted weight values according to the transparency parameters of the reference pixels according to the look-up table, and the adjusted weight values are employed to be the weight values of the reference pixels;

a storage unit coupled to the weight value setting unit for storing the look-up table; and a computing device coupled to the weight value setting unit for generating the pixel values of the reference pixels to generate the pixel value of the target pixel according to the weight values of the reference pixels;

wherein the reference pixel with a transparency parameter less than or equal to a predetermined value is defined as a background pixel and a reference pixel with a transparency parameter greater than the predetermined value is defined as a foreground pixel.

30. The image scaling device of claim 29, wherein the weight value setting unit sets a sum of the weight values of the background pixels to be a value k and setting a sum of the weight values of the foreground pixels to be 1−k, wherein the value k is greater than or equal to zero and 1−k is greater than the value k.

31. The image scaling device of claim 29, wherein the weight value setting unit reduces the non-adjusted weight values of the background pixels and distributes a total decrement of the non-adjusted weight values of the background pixels to the foreground pixels.

32. The image scaling device of claim 29, wherein the weight value setting unit sets a sum of the non-adjusted weight values of the background pixels to be a value k and sets a sum of the weight values of the foreground pixels to be 1−k, wherein the value k is greater than or equal to zero and 1−k is greater than the value k.

33. The image scaling device of claim 29, wherein the computing device generates the transparency parameters to calculate a transparency parameter of the target pixel according to the non-adjusted weight values.

34. The image scaling device of claim 29, wherein the image block is a subtitle.

35. The image scaling device of claim 29, wherein the image block is a closed caption.

36. The image scaling device of claim 29, wherein the computing device is a digital filter.

* * * * *